(12) United States Patent
Voong et al.

(10) Patent No.: US 9,387,598 B2
(45) Date of Patent: Jul. 12, 2016

(54) MITER SAW WITH ACTIVE CONTROL ENERGY DAMPENER

(71) Applicants: Robert Bosch Tool Corporation, Broadview, IL (US); Robert Bosch GmbH, Stuttgart (DE)

(72) Inventors: Gary L. Voong, Chicago, IL (US); Prashant Jayaraman, Barrington, IL (US)

(73) Assignee: Robert Bosch GmbH, Stuttgart (DE)

( * ) Notice: Subject to any disclaimer, the term of this patent is extended or adjusted under 35 U.S.C. 154(b) by 315 days.

(21) Appl. No.: 14/209,319

(22) Filed: Mar. 13, 2014

(65) Prior Publication Data

US 2014/0260846 A1  Sep. 18, 2014

Related U.S. Application Data

(60) Provisional application No. 61/781,749, filed on Mar. 14, 2013.

(51) Int. Cl.
  *B26D 7/24* (2006.01)
  *F16P 3/00* (2006.01)
  *B23D 47/00* (2006.01)
  (Continued)

(52) U.S. Cl.
  CPC ........ *B26D 7/24* (2013.01); *B23D 47/00* (2013.01); *F16P 3/008* (2013.01); *B26D 1/16* (2013.01); *B27B 5/38* (2013.01); *Y10T 83/04* (2015.04); *Y10T 83/081* (2015.04)

(58) Field of Classification Search
  CPC ..... Y10T 83/04; Y10T 83/081; Y10T 83/089; Y10T 83/088; Y10T 83/7693; Y10T 83/7697; Y10T 83/7701; Y10T 83/7705; Y10T 83/7726; Y10T 83/773; Y10T 83/8773; B25D 59/001; B25D 59/00; B25D 45/00; B25D 45/04; B27B 5/38; B27B 5/00; B27B 5/29; B26D 7/24; F16P 3/008; F16P 7/00; F16P 7/02

See application file for complete search history.

(56) References Cited

U.S. PATENT DOCUMENTS 5,503,255 A * 4/1996 Martinsson ........... B27B 17/083
                                                    188/77 W
6,866,568 B1 * 3/2005 Liao ..................... B23D 45/042
                                                    125/13.01

(Continued)

FOREIGN PATENT DOCUMENTS

WO          03006213 A2      1/2003

OTHER PUBLICATIONS

International Search Report and Written Opinion corresponding to PCT Application No. PCT/US2014/026297, mailed Jul. 3, 2014 (20 pages).

*Primary Examiner* — Phong Nguyen
(74) *Attorney, Agent, or Firm* — Maginot Moore & Beck LLP

(57) ABSTRACT

An automatic braking system for a pivoting power tool includes a cutting assembly, a cutting arm supporting the cutting assembly, a hinge supporting the cutting arm through a pivot, a primary braking system operably connected to the cutting assembly, a safety circuit configured to sense an unsafe condition and, in response to sensing the unsafe condition, control the primary braking system to oppose rotation of a blade supported by the cutting assembly, and a damper system operably connected to the cutting arm, the damper system configured to oppose rotation of the cutting arm when the primary braking system is controlled to oppose rotation of the blade.

11 Claims, 4 Drawing Sheets

(51) Int. Cl.
*B26D 1/16* (2006.01)
*B27B 5/38* (2006.01)

(56) References Cited

U.S. PATENT DOCUMENTS 7,410,006 B2 8/2008 Zhang et al.
2002/0017175 A1 2/2002 Gass et al.
2002/0020261 A1 2/2002 Gass et al.
2005/0204885 A1 9/2005 Gass et al.
2005/0268767 A1 12/2005 Pierga et al.
2008/0196991 A1 8/2008 Eppard
2011/0048197 A1 3/2011 Winkler
2011/0239837 A1 10/2011 Gass et al.
2012/0137848 A1 6/2012 Gass et al.

* cited by examiner

US 9,387,598 B2

MITER SAW WITH ACTIVE CONTROL ENERGY DAMPENER

This application claims the benefit of U.S. Provisional Application No. 61/781,749 filed Mar. 14, 2013, the entirety of which is incorporated herein by reference.

FIELD

This disclosure relates to machines such as miter saws which include protective systems configured to rapidly stop rotational movement of a shaping device.

BACKGROUND

A number of power tools have been produced to facilitate forming a work piece into a desired shape. One such power tool is a miter saw. Miter saws present a safety concern because the saw blade of the miter saw is typically very sharp and moving at a high rate of speed. Accordingly, severe injury such as severed digits and deep lacerations can occur almost instantaneously. A number of different safety systems have been developed for miter saws in response to the dangers inherent in an exposed blade moving at high speed. One such safety system is a blade guard. Blade guards movably enclose the saw blade, thereby providing a physical barrier that must be moved before the rotating blade is exposed. While blade guards are effective to prevent some injuries, a user's finger is nonetheless in proximity to the moving blade, particularly when attempting to secure a work piece as the miter saw is used to shape the work piece.

Miter saw safety systems have been developed which are intended to stop the blade when a user's hand approaches or touches the blade. Various stopping devices have been developed including braking devices which are physically inserted into the teeth of the blade. In general, upon detection of a person in the vicinity of the blade, a signal is processed and sent to a brake mechanism to stop blade rotation within a short period of time. One such system is disclosed in U.S. Patent Publication No. 2011/0048197. In other systems, a mechanical or electrical brake is used. In all of these systems, however, the short stopping time of the blade generates a large angular momentum that will either swing the head up or down (depending on blade or motor rotation direction for miter saws) with a high force which is destructive to the structure of the tool. In addition to posing a danger to the tool, the high angular momentum forces pose an additional injury risk to the user.

What is needed therefore is a simple and reliable configuration which reduces the potential for transferring high angular momentum forces to a tool thereby causing movement of the tool.

SUMMARY

In one embodiment, an automatic braking system for a pivoting power tool includes a cutting assembly, a cutting arm supporting the cutting assembly, a hinge supporting the cutting arm through a pivot, a primary braking system operably connected to the cutting assembly, a safety circuit configured to sense an unsafe condition and, in response to sensing the unsafe condition, control the primary braking system to oppose rotation of a blade supported by the cutting assembly, and a damper system operably connected to the cutting arm, the damper system configured to oppose rotation of the cutting arm when the primary braking system is controlled to oppose rotation of the blade.

In another embodiment, a method of operating an automatic braking system for a pivoting power tool includes supporting a cutting assembly with a cutting arm, sensing an unsafe condition using a safety circuit, controlling with the safety circuit a primary braking system to oppose rotation of a blade supported by the cutting assembly in response to sensing the unsafe condition, and opposing with a damper system rotation of the cutting arm about a pivot when the primary braking system is controlled to oppose rotation of the blade.

DESCRIPTION

Figure 1:
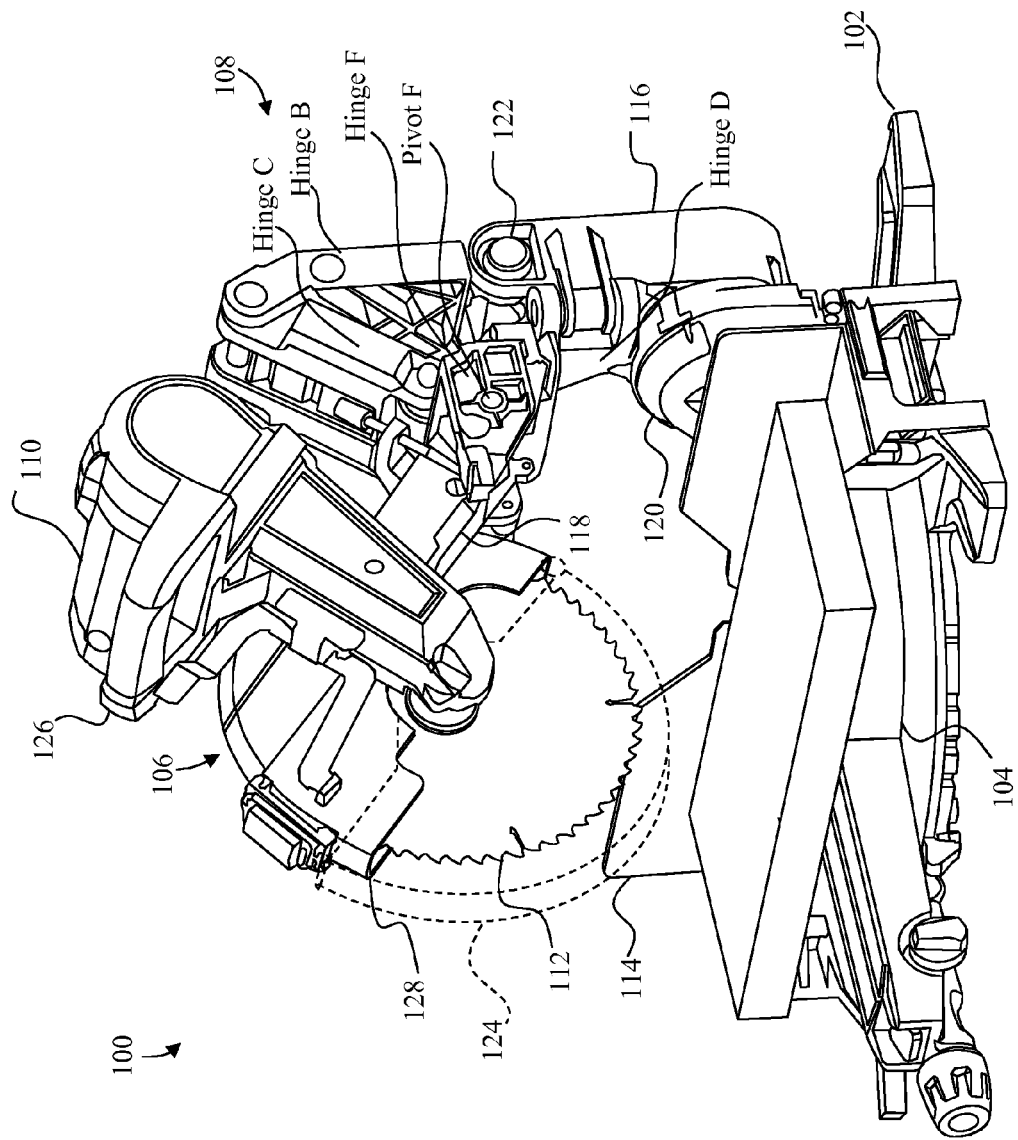
FIG. 1 depicts a front right perspective view of a miter saw assembly.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art to which this disclosure pertains.

Referring now to FIG. 1, there is shown a miter saw assembly 100. The miter saw assembly 100 includes a base 102 and a turntable 104 that is rotatable on the base 102. The miter saw assembly 100 further includes a cutting head 106 mounted on a cutting head support assembly 108. The cutting head 106 (which may also be referred to herein as a "cutting assembly") includes a motor 110 that is operable to rotate a circular saw blade 112. The cutting head support assembly 108 is attached to the turntable 104 and configured to support the cutting head 106 such that the cutting head 106 may move over the turntable 104 and perform cutting operations on a work piece supported by the turntable 104. A rip fence 114 attached to the base 102 may be used to align a work piece thereon.

Figure 2:
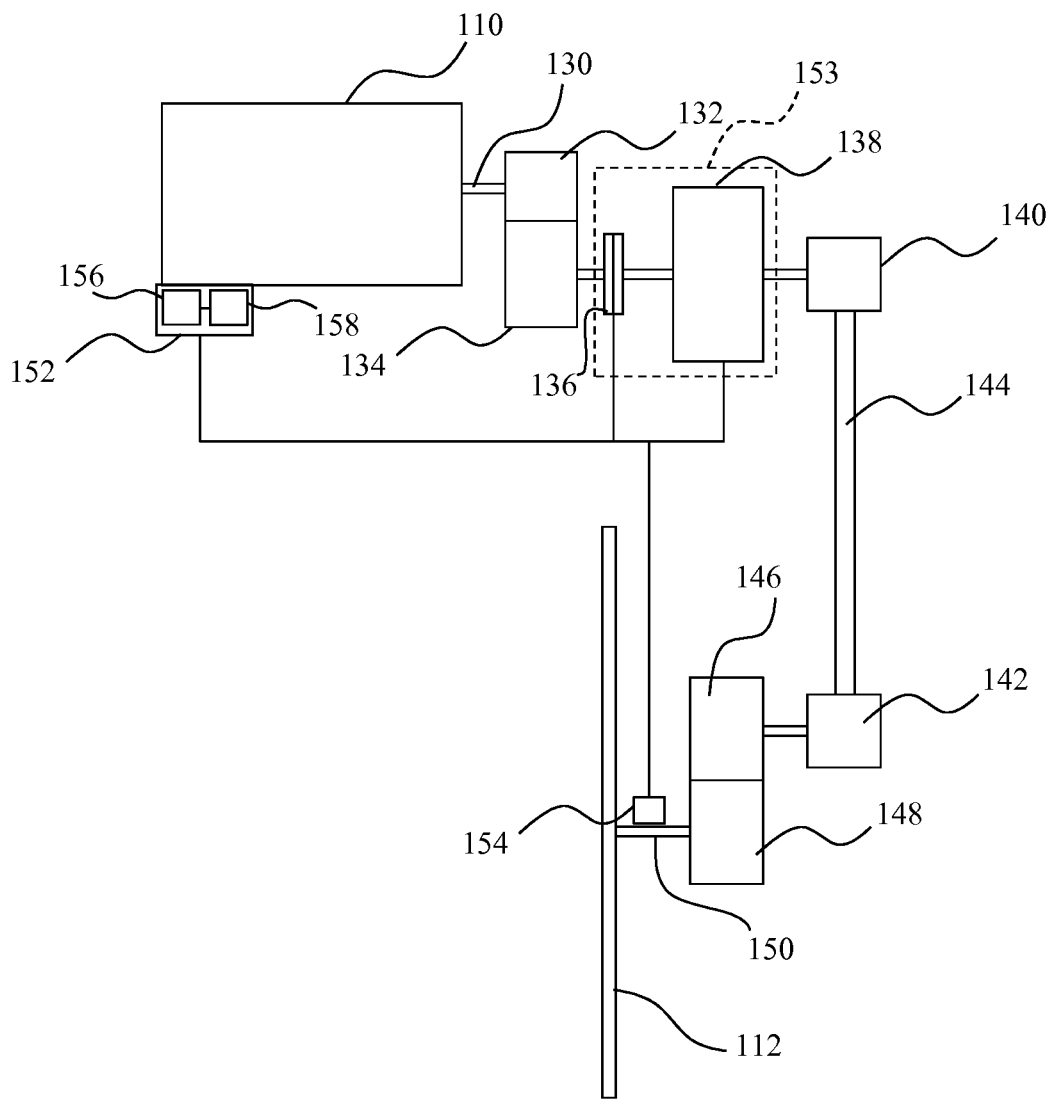
FIG. 2 depicts a schematic diagram of the power transfer train between the motor and the blade including a clutch and a primary braking system.

The cutting head support assembly 108 includes a bevel arm 116, a cutting arm 118, a first pivot mechanism 120, and a second pivot mechanism 122. The bevel arm 116 (also referred to herein as a "bevel post") provides a bevel support structure for the miter saw assembly 100. The bevel arm 116 is pivotally attached to the turntable 104 by the first pivot mechanism 120. The first pivot mechanism 120 includes a hinge arrangement that enables the bevel arm 116 of the support assembly 108 to pivot with respect to the turntable 104 during a setup procedure. In particular, this arrangement is configured to enable the bevel arm 116 to pivot from a vertical position (as shown in FIGS. 1-2) to an angle of 45° (not shown) or more in the leftward direction prior to a cutting operation. This pivoting allows the blade 112 of the cutting assembly 106 to approach the table 104 from a bevel angle and perform angled cuts on a work piece supported on the table 104, as is well known in the art.

The cutting arm 118 of the support assembly 108 provides a support for the cutting assembly 106. The cutting arm 118 is pivotably connected to the bevel arm 116 via the pivot mechanism 122. The pivot mechanism 122 enables pivoting movement of the cutting assembly 106 in relation to the turntable 104 and the base 102 during a cutting operation. This pivoting allows the blade 112 of the cutting assembly 106 to move toward and away from the horizontal turntable 104 to perform a cutting operation. In some embodiments, the cutting arm may be configured to alternatively or additionally allow movement of the cutting assembly along the cutting arm.

The cutting assembly 106 includes a handle 126 connected to the cutting arm 118 to facilitate movement of the cutting assembly 106 in relation to the turntable 104. The handle 126 is designed and dimensioned to be grasped by a human hand when performing a cutting operation. This allows the user to easily pivot the cutting assembly 106. A switch (not shown) may be provided on the handle 126 to allow the user to easily energize and de-energize the electric motor 110 during a cutting operation. A blade guard 128 covers the top portion of the circular saw blade 112. A lower blade guard 124, shown in shadow for purpose of clarity, is rotatably mounted to the cutting head assembly 106. The lower blade guard 124 is configured to rotate in a clockwise direction with respect to the cutting head assembly 106 when the cutting head assembly 106 is pivoted toward the turntable 104 thereby exposing the circular saw blade 112.

Figure 3:
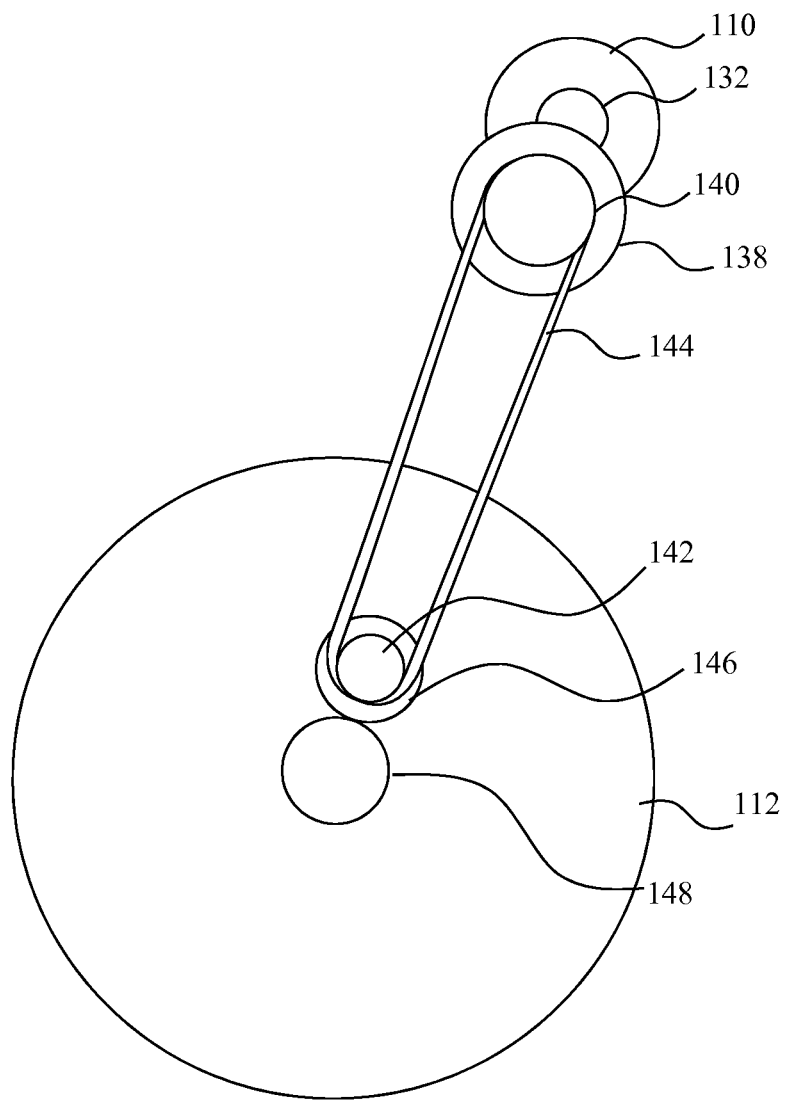
FIG. 3 depicts a simplified plan view of the right side of the power transfer train.

The connection between the motor 110 and the saw blade 112 is further described with reference to FIGS. 2 and 3. The motor 110 has an output shaft 130 which drives a pinion gear 132. The pinion gear 132 is operably connected to a gear 134 that drives a clutch assembly 136. The output of the clutch assembly 136 is operably engaged with a primary braking assembly 138. The primary braking assembly 138 in one embodiment is the braking assembly described in U.S. Patent Application Publication No. 2011/0048197, the entire contents of which are herein incorporated by reference.

The primary braking assembly 138 drives a pulley 140 which is operably connected to a pulley 142 by a belt 144. In some embodiments, the pulley system is replaced by a geared drive system. The pulley 142 is operably connected to a gear 146 which drives a gear 148 operable connected to a drive shaft 150 on which the blade 112 is mounted. The motor 110, along with the gears and pulleys, are configured such that the blade 112 rotates downwardly at a location farthest from the bevel arm 116.

FIG. 2 further shows a safety circuit 152 that is operably connected to the clutch assembly 136, the primary braking assembly 138, and a blade sensor 154 (located adjacent to the drive shaft 150 in this embodiment). The safety circuit 152 includes a processor 156 and a memory 158. Program instructions within the memory 158 are executed by the processor 156 to perform at least some of the actions ascribed to the safety circuit herein. The safety circuit 152 detects when a user too closely approaches or touches the blade 112 and issues a signal which disengages the clutch 136 and activates the primary braking assembly 138 to rapidly stop as discussed in more detail in the '197 Publication.

Figure 4:
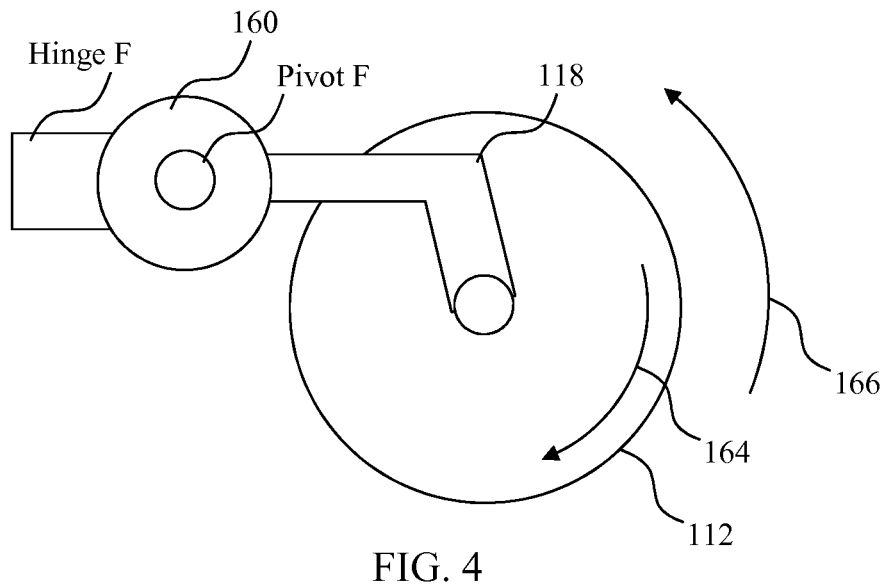
FIG. 4 depicts a simplified left side plan view of a hydraulic torsional dampener located at the pivot between the cutter arm and bevel arm.

The safety circuit 152 is further connected to a dampener which in this embodiment is a hydraulic torsional dampener 160 (see FIG. 4). The torsional dampener 160 is located at the pivot 122 between the cutting arm 118 and the bevel arm 116 and is activated at about the same time as the primary braking assembly 138. Accordingly, as the rotation of the blade 112 in the direction of the arrow 164 (see FIG. 4) is terminated by the primary braking assembly 138, a large angular momentum in the direction of the arrow 166 is generated which forces the cutting arm 118 to pivot about the pivot 122 in the direction of the arrow 166. The hydraulic torsional dampener 160, however, counters the large angular momentum, thereby reducing any movement of the cutting arm 118 in the direction of the arrow 166. The active dampening system which includes the dampener 160 is thus configured to reduce the destructive force that could transfer to the structure of the tool or to the hand of the end user. This dampening system makes the braking of the blade in a short time possible for miter saws without undesired "kickback" of the cutting arm 118.

Figure 5:
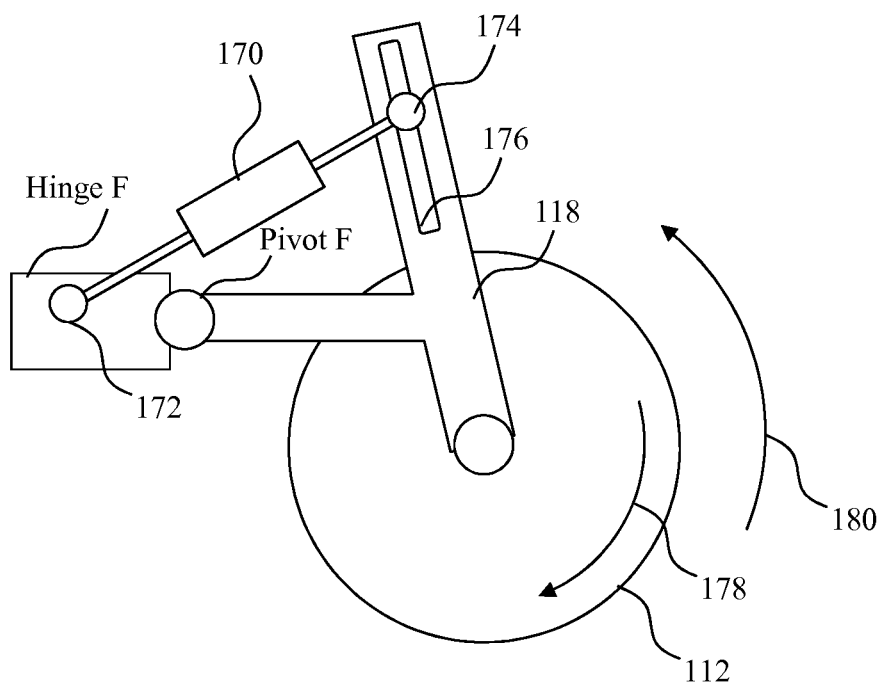
FIG. 5 depicts a simplified left side plan view of a hydraulic linear dampener extending between the cutter arm and bevel arm.

In some embodiments, the torsional dampener is replaced with a linear dampener. FIG. 5 depicts a linear dampener 170 with a first end 172 pivotably attached to the bevel arm 116 and a second end 174 positioned within a slot 176 in the cutting arm 118. Accordingly, as the rotation of the blade 112 in the direction of the arrow is terminated by the primary braking assembly 138 in the manner described above, a large angular momentum in the direction of the arrow 180 is generated which forces the cutting arm 118 to pivot about the pivot 122 in the direction of the arrow 180. The hydraulic linear dampener 170, however, is activated and at the same time the end portion 174 is locked within the slot 176 by the safety circuit 152. The linear dampener 170 thus counters the large angular momentum, thereby reducing any movement of the cutting arm 118 in the direction of the arrow 180.

The incorporation of a dampener such as the hydraulic torsional dampener 160 or the linear dampener 170 reduces output force to the structure of a power tool to enable for braking within a predetermined time to mitigate potential injuries. The dampening system enables control of a power tool such as miter saw head assemblies.

The described system in different embodiments is configured as a torsional or linear form and can be configured between the bevel arm and cutting arm (as shown in above figures or in similar configurations).

The described dampening system in some embodiments is activated using the angular acceleration of the cutting arm through mechanisms similar to that of an automotive seatbelt or other mechanical means. In other embodiments, a dampening system is activated using an electromechanical system. In some embodiments, activation of the dampening system is accomplished by locking an end of the dampener which is free to move during normal saw operation.

The above described system in some embodiments is used with a mechanical brake similar to that described in the '197 Application and is sized accordingly based on moment inertia of the blade and other rotation components the blade is connected to.

In some embodiments, the primary brake is a mechanical brake such as an aluminum block that makes contact with the blade teeth, or any friction material that makes contact with the blade walls, output shafts, or any drive mechanism. In some embodiments, the primary brake is an electronic brake generated within the motor assembly.

In different embodiments, the output force reduction occurs immediately after flesh detection or after flesh detection plus a predetermined time.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

The invention claimed is:

1. A method of operating an automatic braking system for a pivoting power tool, comprising:
   supporting a cutting assembly with a cutting arm;
   sensing an unsafe condition using a safety circuit;
   controlling with the safety circuit a primary braking system to oppose rotation of a blade supported by the cutting assembly in response to sensing the unsafe condition;
   opposing with a damper system rotation of the cutting arm about a pivot when the primary braking system is controlled to oppose rotation of the blade; and
   controlling the damper system comprising controlling a linear damper operably connected to the cutting arm and to a bevel post supporting the cutting arm;
   wherein the cutting arm includes a slot and the linear damper is pivotably attached to the bevel post at a first end portion and includes a second end portion positioned within the slot, and wherein controlling the linear damper comprises locking the second end portion within the slot.

2. The method of claim 1, wherein opposing with a damper system comprises:
   activating the damper system by angular acceleration of the cutting arm.

3. The method of claim 1, wherein opposing with a damper system comprises:
   controlling the damper system with the safety circuit in response to sensing the unsafe condition.

4. The method of claim of claim 3, further comprising:
   disengaging with the safety circuit a primary clutch through which the primary braking assembly is operably connected to a motor in response to sensing the unsafe condition.

5. The method of claim 4 further comprising:
   rotating the blade with the motor through a pulley operably connected to the primary clutch prior to sensing the unsafe condition.

6. The method of claim 3, wherein controlling with the safety circuit the primary braking system to oppose rotation of the blade occurs substantially simultaneously with controlling with the safety circuit the damper system.

7. An automatic braking system for a pivoting power tool, comprising:
   a cutting assembly;
   a cutting arm supporting the cutting assembly;
   a hinge supporting the cutting arm through a pivot;
   a primary braking system operably connected to the cutting assembly;
   a safety circuit configured to sense an unsafe condition and, in response to sensing the unsafe condition, control the primary braking system to oppose rotation of a blade supported by the cutting assembly; and
   a damper system operably connected to the cutting arm, the damper system configured to oppose rotation of the cutting arm when the primary braking system is controlled to oppose rotation of the blade;
      wherein the damper system comprises a linear damper operably connected to the cutting arm and to a bevel post supporting the cutting arm;
      wherein the cutting arm includes a slot and the linear damper is pivotably attached to the bevel post at a first end portion and includes a second end portion positioned within the slot; and
      wherein activation of the damper system comprises locking the second end portion within the slot.

8. The automatic braking system of claim 7, wherein the damper system is activated by angular acceleration of the cutting arm.

9. The automatic braking system of claim 7, wherein the safety circuit is further configured to activate the damper system in response to sensing the unsafe condition.

10. The automatic braking system of claim 9, wherein:
    the primary braking assembly is operably connected to a motor through a primary clutch; and
    the safety circuit is configured to disengage the primary clutch in response to sensing the unsafe condition.

11. The automatic braking system of claim 10, wherein:
    the primary braking assembly is operably positioned between the primary clutch and a pulley, the pulley operably connected to the blade.

* * * * *